United States Patent [19]
Flynn et al.

[11] Patent Number: 5,304,881
[45] Date of Patent: Apr. 19, 1994

[54] MEANS FOR PRODUCING ROTARY MOTION

[75] Inventors: Charles J. Flynn, Kansas City; David M. Flynn, Sikeston, both of Mo.

[73] Assignee: Magnetic Revolutions, Inc., St. Louis, Mo.

[21] Appl. No.: 322,121

[22] Filed: Mar. 13, 1989

[51] Int. Cl.$^5$ .............................................. H02K 21/12
[52] U.S. Cl. .................................. 310/156; 310/261; 310/268; 335/272
[58] Field of Search ................. 335/272, 279; 310/36, 310/40 R, 46, 152, 154, 156, 261, 268

[56] References Cited

U.S. PATENT DOCUMENTS

| | | | |
|---|---|---|---|
| 2,669,687 | 2/1954 | Tastes | 310/46 X |
| 2,987,657 | 6/1961 | Buchtenkirch et al. | 335/272 X |
| 3,949,250 | 4/1976 | Walker et al. | 335/272 X |
| 4,164,722 | 8/1979 | Garvey | 335/272 |
| 4,456,858 | 6/1984 | Loven | 310/156 X |
| 4,528,533 | 7/1985 | Montagu | 335/272 X |
| 4,724,349 | 2/1988 | Grimm | 310/216 X |
| 4,794,291 | 12/1988 | Abukawa | 310/154 |

FOREIGN PATENT DOCUMENTS

| | | | |
|---|---|---|---|
| 712730 | 9/1941 | Fed. Rep. of Germany | 335/272 |
| 2336703 | 2/1975 | Fed. Rep. of Germany | 310/416 |
| 2637705 | 2/1978 | Fed. Rep. of Germany | 310/154 |
| 1151901 | 5/1969 | United Kingdom | 335/272 |

Primary Examiner—Leo P. Picard
Assistant Examiner—R. Barrera
Attorney, Agent, or Firm—Haverstock, Garrett & Roberts

[57] ABSTRACT

A device for converting magnetic force to mechanical force including a member having an axis about which it is rotatable, the member having a peripheral edge portion formed of a material that is effected by the presence of a magnetic force adjacent thereto, at least one magnetic member positioned adjacent the peripheral portion of the rotatable member to produce a magnetic coupling force therebetween, the peripheral portion of the rotatable member having a shape such that the magnetic coupling between the magnetic member and the peripheral portion of the rotatable member varies continuously as the rotatable member rotates.

15 Claims, 4 Drawing Sheets

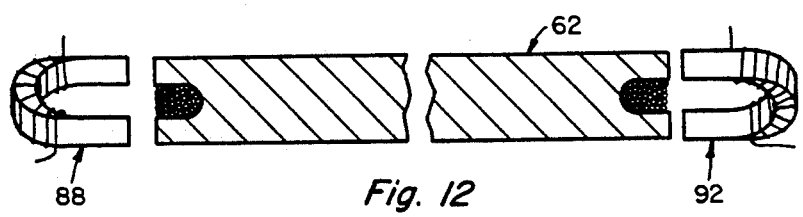
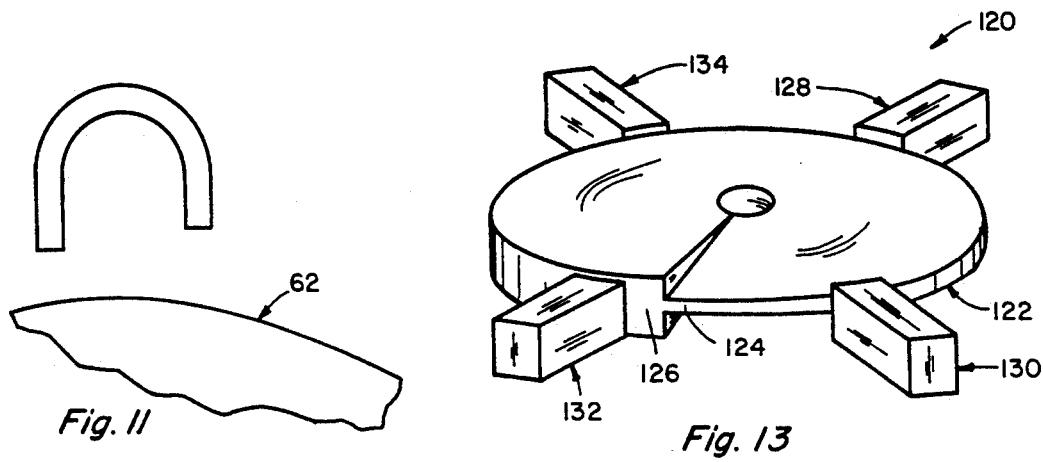
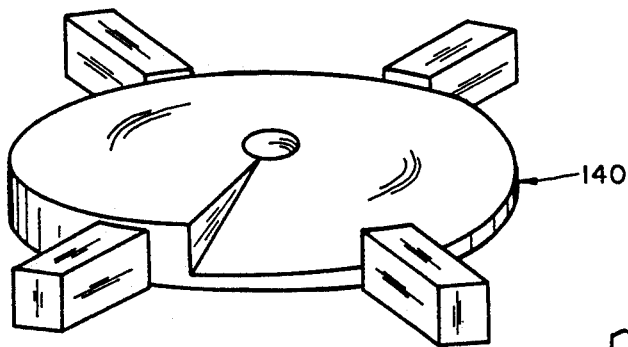
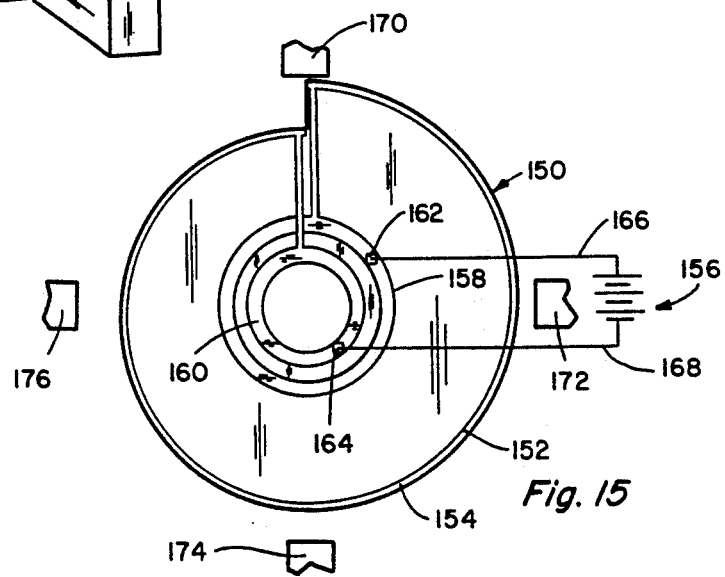

MEANS FOR PRODUCING ROTARY MOTION

BACKGROUND OF THE INVENTION

The present invention relates to a new and useful means for generating power, including rotational power, and more specifically to means for converting magnetic energy to mechanical or rotational energy or force. The present invention also relates to such a device that makes use of a rate of change of the distance or spacing between two or more members to produce this desired effect. The rate of change may be of a physical distance, a magnetic force, a changing mass resulting in a change of magnetic force or a change in magnetic coupling. More particularly the present invention takes advantage in a unique way of Coulomb's Law of Magnetism which states that the magnetic coupling or force between any two objects is inversely related to the square of the distance between the objects.

Devices constructed according to the present invention include magnetic members which may be permanent magnets or electromagnets. Such magnet or magnets are positioned adjacent to the edge of a rotatable member or disk so constructed as to produce a specific varying spaced relationship between each magnet and the rotational member whereby the magnetic coupling between the respective magnets and the rotational member changes continuously as the rotational member rotates. Another way of expressing this phenomenon is to say that there is a continuous change in the mass of the magnetic material in the rotational member that is exposed to each magnet as the rotational member rotates relative thereto. Whether the magnetic coupling is produced using permanent magnets or electromagnets or through other means is immaterial to the teachings of the present invention. The important thing is that there is a continuous rate of change of the coupling force between each magnet employed and the rotational member associated therewith and this rate of change of coupling force occurs continuously up to 360° of rotation irrespective of the type of magnetic means employed to produce the coupling force.

The present invention can therefore be described as a rate of change motor or motor like means or a rate of change coupling device. This is because the present device employs in its preferred form a rotatable disk like member that has magnetic or magnetizable characteristics at least adjacent its periphery. Of particular importance is the fact that the rotatable disk has its peripheral edge in the shape of a 360° spiral that extends uniformally from a radially most inward location to a radially most outward location at or adjacent to the same location on its circumference. The magnetic member or members, which may be one or more permanent magnets or electromagnets, are positioned on a circular path at circumferentially spaced locations such as at 90° intervals around the periphery of the rotatable disk and at differently spaced distances radially from the spiral disk edge. The distance or coupling between each magnet or magnets and the disk will therefore continuously vary for each magnet but instantaneously will be different for each magnet as the disk member rotates.

The design of the present device should take into account that coupling forces will be produced between the various magnets and the disk and in all positions of the disk the net amount of the coupling forces tending to rotate the disk in one direction will always exceed any coupling force tending to stop or impede rotation. To satisfy this requirement for all positions of the disk involves establishing a desired shape for the outer spiral shaped edge portion of the disk member, establishing the construction and locations of the magnets spaced therearound and the distance between the magnets or portions of the magnets and the disks at various locations and establishing some desired magnetic strength and magnetic characteristic for the peripheral portion of the disk member.

PRIOR ART

There are in existence various motor or motor like devices which use magnetic force to produce the rotation of a member. Typical of such devices are the devices shown in U.S. Pat Nos. 689,483; 1,481,256; 3,621,424; 3,801,095; 4,179,633; 4,598,221; and 4,751,486. None of these known prior art devices includes a rotating disk with a spiral shaped edge having at least its peripheral portion formed of a magnetic or magnetizable material. Furthermore, no known device has magnets positioned about the peripheral edge portion of such a rotatable member along a circular path that exceeds to some extent the maximum diameter of the peripheral edge portion of the rotating disk relative to the center of rotation thereof so that as the disk rotates the spacing between the disk and each of the respective magnets will constantly change. Therefore, none of the known devices achieves or addresses the same problems or produces the same kind of drive force that is produced in the present device. Still further no known magnetic drive device uses stationary as distinguished from movable magnets to produce the driving force.

Several different embodiments of the rotatable member used in the present invention are disclosed including embodiments where the rotatable member has a spiral edge, one where the mass of the edge portion varies, and one where a conductor is mounted around the periphery of the member.

It is therefore a principle object of the present invention to use stationary magnet means to produce rotational motion in a member having magnetizable characteristics.

Another object is to teach the construction and operation of a motor or motor like device which produces a constantly changing drive coupling between a rotating member and one or more stationary magnet members by continuously changing the spacing therebetween as the rotating member rotates.

Another object is to provide magnetic drive means which makes use of the principle that the magnetic coupling between two members varies inversely with the square of the distance therebetween.

Another object is to provide relatively simple and inexpensive means for generating rotational motion using magnetic coupling.

Another object is to teach the construction of a magnetic motion producing device that can be constructed to always produce an excess of driving force relative to retarding force.

Another object is to use a rotatable magnetizable member having a spiral shaped peripheral edge portion and spaced magnet members positioned thereabout to produce rotary motion.

Another object is to construct a motor or motor-like device that operates on magnetic principles and can be constructed using permanent magnets or electromagnets.

Another object is to devise a magnetic drive device in which the optimum operating conditions can be calculated based on Coulomb's Law of Magnetism.

Another object is to construct a motor-like device which causes a constantly changing mass on a rotating member to be exposed to the field of magnet means positioned adjacent thereto.

Another object is to provide a relatively economical means for producing rotational motion.

These and other objects and advantages of the present invention will become apparent after considering the following detailed specification in conjunction with the accompanying drawings which form parts thereof.

DESCRIPTION OF THE DRAWINGS

FIG. 11 is a fragmentary side elevational view showing another embodiment of a magnet for use with subject device;

FIG. 12 is a cross-sectional view similar to FIG. 7 wherein the rotatable member is shown having an electric winding mounted thereon;

FIG. 13 is a perspective view showing another embodiment of the subject device that makes use of a circumferential change in mass of the rotatable member exposed to the adjacent magnets;

FIG. 14 is a perspective view showing a variation in the construction of FIG. 13; and FIG. 15 is a side elevational view showing still another embodiment for the rotatable member.

DETAILED DESCRIPTION OF THE PREFERRED EMBODIMENT

Figure 1:
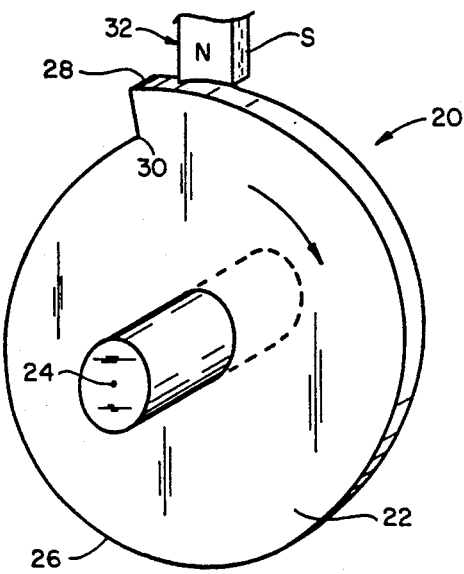
FIG. 1 is a perspective view of a simplified version of the present device.

Referring to the drawings more particularly by reference numbers, number 20 in FIG. 1 refers to a magnetic drive device constructed according to the teachings of the present invention. The embodiment 20 includes a rotatable member or disk 22 constructed at least in part of magnetic or magnetizable material including especially the peripheral portion thereof. The disk 22 is rotatable about an axis of rotation shown at point 24, and the disk 22 has a peripheral edge 26 of spiral shape extending circumferentially about the periphery thereof from a point 28 of maximum diameter to an adjacent point 30 where the diameter is at a minimum. A magnet, shown in FIG. 1 as permanent magnet 32, is mounted adjacent to the spiral shaped peripheral edge surface 26 of the disk 22 in position such that as the disk 22 rotates about its axis 24 the distance between the magnet 32 and the edge surface 26 will continuously change. This fact is basic to an understanding of the present invention.

Since the magnet 32 and at least the peripheral portion of the disk 22 in this construction are both magnetic or magnetizable there will be some magnetic coupling or attraction between the magnet 32 and the disk 22, and for one direction of rotation of the disk 22 (clockwise as shown) the magnetic coupling will increase at all times except for a short period when the magnet 32 is adjacent to the point 28 on the disk 22. At this time the magnetic coupling will be at a maximum and the magnet 32 will stop or try to stop further rotation of the disk 22. In the single magnet construction shown in FIG. 1 the disk 22 will rotate to a position where the magnet 32 is adjacent to the point 28 and stop. Such a construction has limited utility but helps to explain the operation which will be more fully explained hereinafter.

Figure 2:
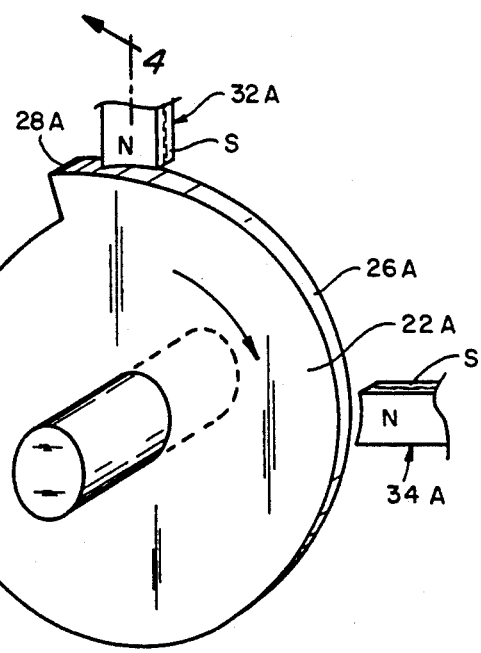
FIG. 2 is a perspective view showing a multi-magnet version of the device shown in FIG. 1.

Referring now to FIG. 2 there is shown a more practical construction wherein there are four spaced permanent magnets 32A, 34A, 36A, and 38A equally spaced at 90° intervals about the peripheral edge surface 26A of the disk 22A. In this case disk 22A is shown mounted for rotation on a shaft 40. The axis of the disk 22A is such that the spacing and hence coupling, between the magnets 32A-38A and the disk 22A, will be different for each magnet. However, the magnetic coupling force between any three of the magnets and the disk 22A must always be greater than the coupling force between any one of the magnets and the disk 22A in every position of the disk. This means that if one of the magnets is adjacent to the point or edge 28A on the disk 22A so that its magnetic coupling with the disk retards rotation in the direction of rotation (clockwise as shown) the effective coupling between the other three magnets and the disk will be greater than the retarding force of the one so that the disk will continue to rotate in the same desired direction. This fact can be proven by Coulomb's Law of Magnetism which states that the magnetic coupling between two members varies inversely with the square of the distance between the members. Application of this law to the present construction establishes that there will always be a net coupling force between the four magnets and the disk which will cause the disk to start and to continue to rotate indefinitely in the same direction once started.

Referring again to FIG. 2 the magnet members 32A-38A are shown having their north and south poles on opposite sides thereof and adjacent the respective opposite sides of the disk 22A. The disk 22A can also have different magnetic poles adjacent to opposite sides or faces and it is also comtemplated to use C-shaped magnets with the magnets straddling the edge portion of the disk.

Figure 3:
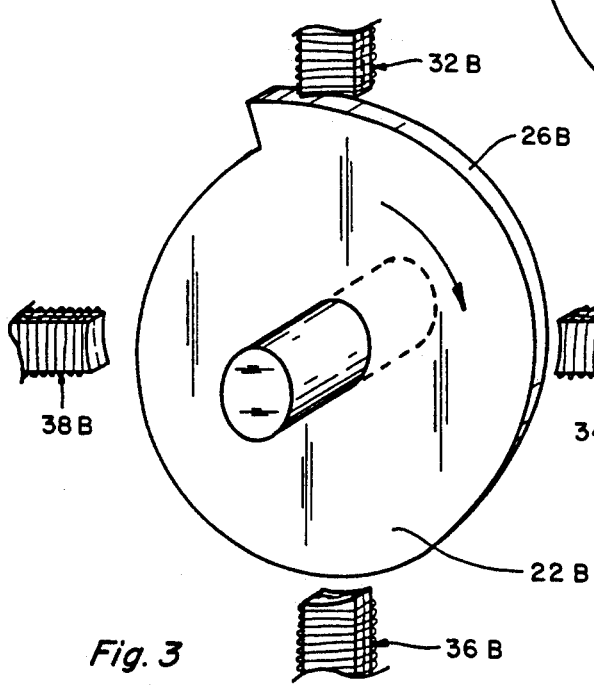
FIG. 3 is a view similar to FIG. 2 but showing a device using electromagnets instead of permanent magnets.

FIG. 3 shows a similar construction using electromagnets 32B-38B. Except for the use of electromagnets instead of permanent magnets the device of FIG. 3 is similar to and operates similar to the construction shown in FIG. 2.

Figure 4:
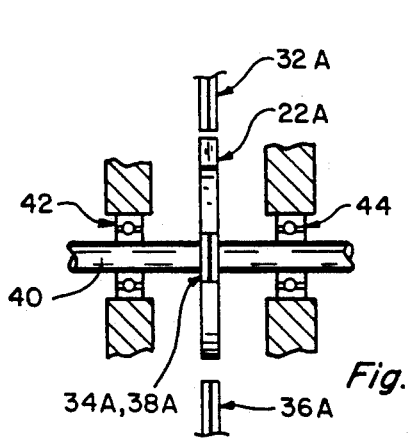
FIG. 4 is a cross-sectional elevational view of the device taken along line 4—4 of FIG. 2.
Figure 8:
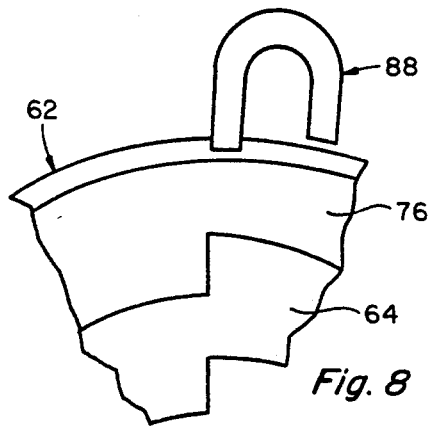
FIG. 8 is a enlarged fragmentary side elevational view showing a portion of the rotatable member of FIG. 6 and a modified form of one of the magnets associated therewith, said rotatable member shown in a particular orientation relative to the magnet.
Figure 7:
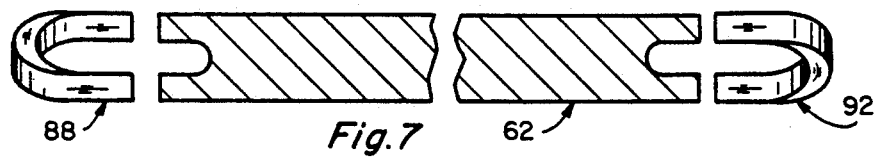
FIG. 7 is a cross-sectional view of the rotational disk portion of the embodiment shown in FIG. 6 taken on line 7—7 therein.
Figure 9:
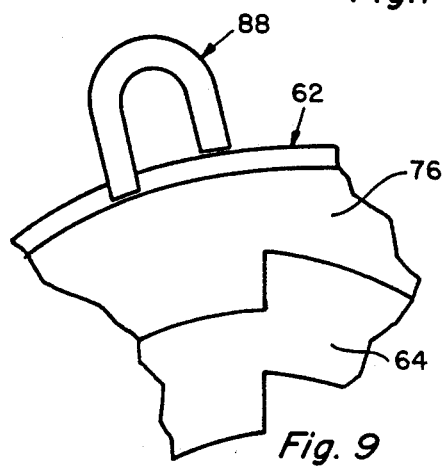
FIG. 9 is a view similar to FIG. 8 but showing a different position of the rotatable member relative to the magnet.
Figure 10:
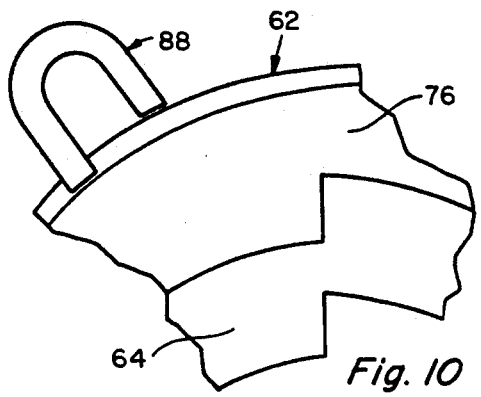
FIG. 10 is another view similar to FIG. 8 but showing a still different position for the rotatable member relative to the magnet.

FIG. 4 shows the disk 22A mounted on the shaft 40 which shaft is journaled for rotation in bearing assemblies 42 and 44.

Figure 5:
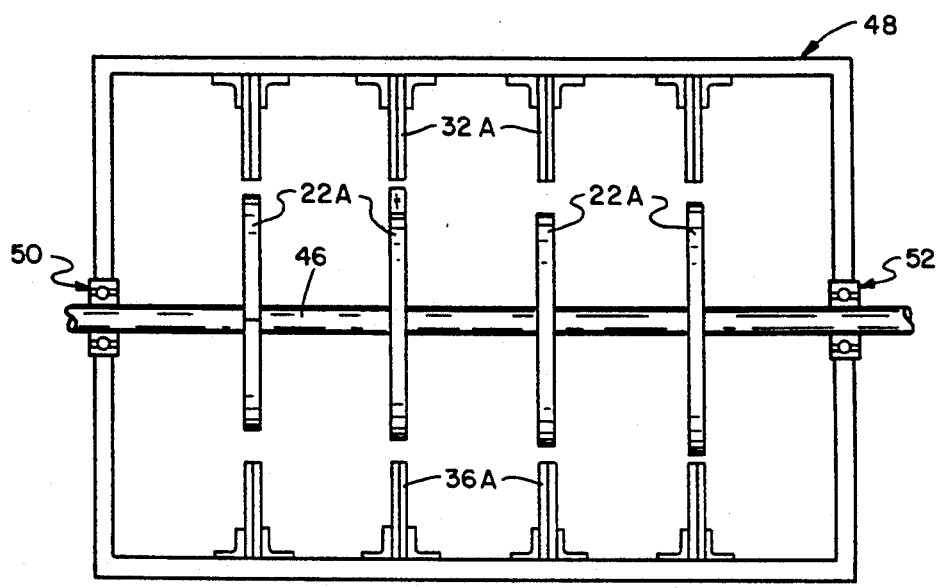
FIG. 5 is a side elevational view similar to FIG. 4 but showing a plurality of rotating disks mounted on a common shaft and showing some of the associated magnets.

FIG. 5 shows a construction similar to FIG. 4 but with a plurality of disks similar to the disk 22A mounted at spaced locations on the same shaft 46. Each of the disks 22A has its own set of magnets shown located or mounted in a housing or cage structure 48. The shaft 46 is journaled for rotation in the housing 48 by bearing assemblies 50 and 52. In the construction of FIG. 5 it is usually preferred to stagger the locations of the points or edges 28A on the different disks so that they are not all in alignment along the length of the device. This is usually done to smooth the operation by eliminating or at least reducing any tendency to produce ripple effects in the driving and retarding forces.

Figure 6:
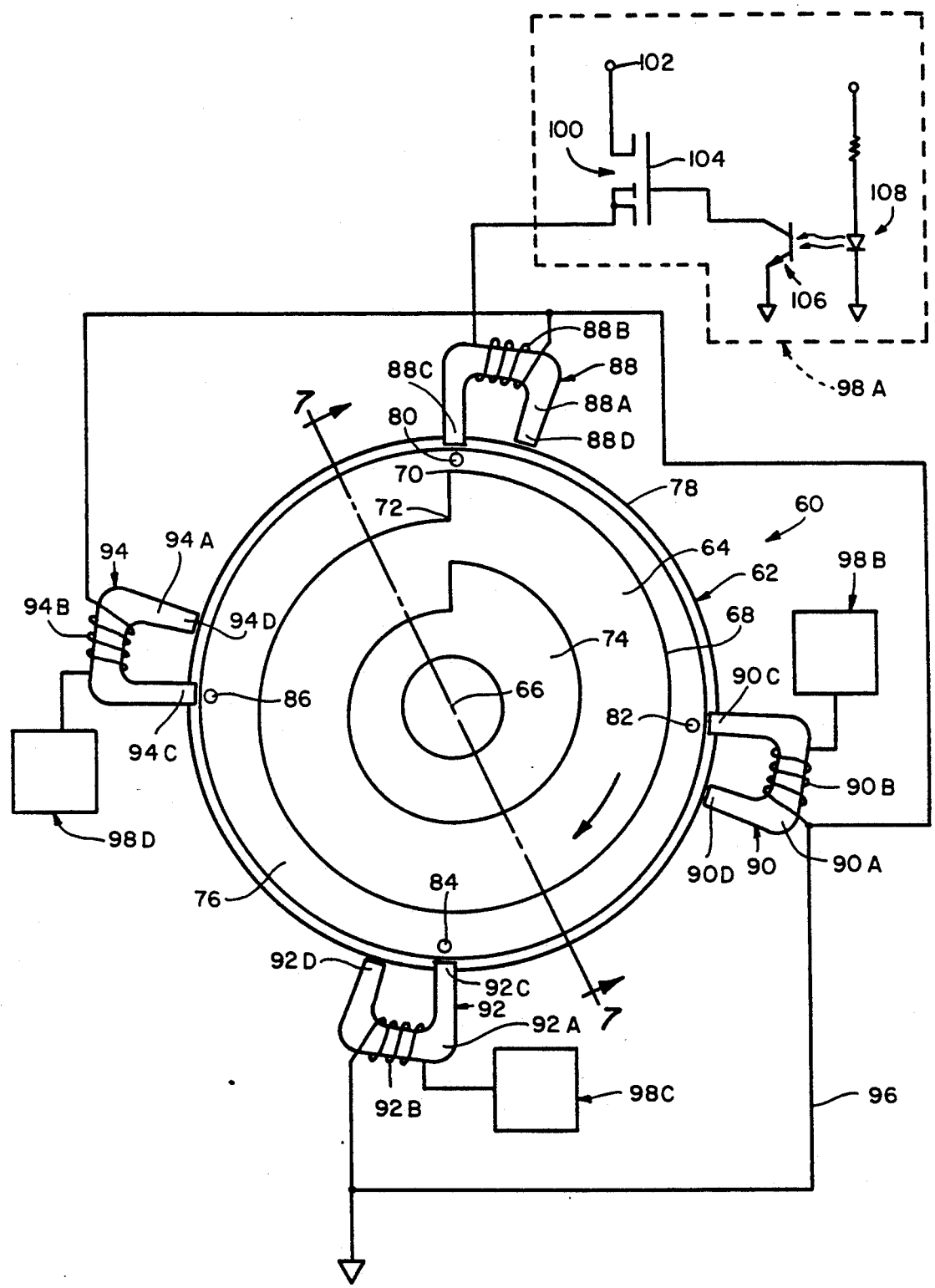
FIG. 6 is a side elevational view showing another embodiment of the present device using electromagnets.

FIG. 6 shows another embodiment 60 of the present device which includes rotatable disk member 62 with a magnetic portion 64 formed as a permanent magnet or of a relatively soft iron material. The disk 62 is rotatable about an axis at 66 and the portion 64 has a spiral shaped outer edge 68 which extends from an outer most point or edge at 70 to an adjacent inner most point or edge at 72. The magnetic portion 64 is shown mounted on an inner core member 74 and an outer peripheral portion 76 extends around the magnetic portion 64. The peripheral portion 76 may be made of plexiglass or some other like material and the portion 76 is round having an outer edge or surface 78 and an inner edge which is attached to the periphery of the magnetic portion 64 or attached one side thereof if desired. The radial thickness or width of the peripheral portion 76 that extends radially beyond the magnetic portion 64 should be as small as possible in order to provide the most possible magnetic coupling as will be described, and in the embodiment shown the peripheral portion is shown having at least one hole 80 and possibly four holes 80, 82, 84 and 86 extending therethrough as shown.

The embodiment 60 also has four circumferentially equally spaced electromagnets 88, 90, 92 and 94 located along a circular path adjacent to the peripheral edge 78 of the peripheral portion 76. All of the electromagnets 88–94 are shown of similar construction each including a C-shaped core 88A–94A with a winding 88B–94B mounted thereon. In the device as shown the magnet cores 88A–94B each have one leg 88C–94C that is longer than the other leg 88D–94D.

One end of each of the magnet windings 88B–94B is connected to ground by a wire 96 and the other end of each winding is connected to a interruptable power supply through a respective control circuit such as the semiconducter control circuits 98A–98D. Each circuit as shown includes a MOSFET such as MOSFET 100 which operates as a switch between the respective winding 88B–94B and a voltage source 102. Each MOSFET, such as MOSFET 100, has a gate electrode 104 connected to a device such as phototransistor 106 that is positioned on one side of the peripheral disk portion 76 in position to be aligned with the orifice 80 during rotation of the member 62. On the opposite side of the member 62, also in position to be aligned with the orifice 80, are a respective infrared or like emitter 108. When the member 62 moves the orifice between one of the phototransistors or transducers 106 and the respective emitter 108 the light from the emitter 108 will fall on the transducer and cause the transistor 106 to be grounded. The ground will momentarily interrupt the voltage 102 to the respective magnet so that the magnetic coupling between that magnet 88 and the magnetic member 64 will also be interrupted. This is done at the time the high spot 70 on the magnetic member 64 moves past or adjacent to the magnet 88, and in so doing will momentarily remove the retarding magnetic coupling force thereby enabling more forward directed coupling force to be available to rotate the member 62. The advantages of this are readily apparent in maintaining greater driving force or output on the disk and on any members connected thereto.

The orifice 80 will move past each of the magnets 88–94 in order as the member 64 rotates clockwise and in so doing will interrupt the magnetic coupling of each magnet as it moves past the point 70. Thus, even though there will always be an excess of driving over retarding force as explained above, by eliminating all or a substantial portion of the retarding force as each magnet moves past the point 70 will substantially increase the output. The time duration during which power is removed from each magnet as it passes the high spot 70 can be varied as desired and the timing and duration of these periods can also be adjusted taking into account the response characteristics of the circuits and the inertia of the rotatable member 62.

Also in the device as shown in FIG. 6 the rear or trailing leg 88D–94D of each magnet may, if desired, be made shorter than the forward leg 88C–94C. This further helps to smooth the operation by further reducing or minimizing the retarding force as the high spot 70 on the rotatable member moves past each magnet as will become clear.

Whether the magnetic fields produced by the subject device are produced by permanent or electromagnets is relatively immaterial to the subject invention. What is important is that a rate of change in the coupling force produced by the magnets take place over substantially the full 360° of rotation regardless of how the rate of change is produced. It is also possible as will be shown hereinafter to use a rate of change in the mass of the peripheral portion of the rotating disk (FIGS. 13 and 14) or even to use a non-magnetic conductor member which has current flowing therethrough extending around the spiral peripheral edge of the rotating member or disk to produce the desired result (FIG. 15). If a conductor is used the conductor member will be connected through commutator means to an energy source which generates current flow therein as will be shown and described. The same basic principles apply with regard to all of the constructions shown and described herein, namely they all involve a construction that produces a rate of change of the coupling force between one or more magnetic members and a rotating member or disk as the disk rotates.

It is important to recognize that when two magnetically attracted members are in the fields of each other they will always try to seek an equilibrium condition. However, in all embodiments of the present device the rotatable member will not be able to reach an equilibrium condition because there will always be a net magnetic force trying to move or rotate it. Thus, the disk will always be in an unstable condition but with predictable force or forces acting on it.

It can be shown using Coulomb's Law that if four magnets are mounted at 90° intervals in a circular configuration around the rotatable member as described, the magnetic coupling force between each magnet is at all times instantaneously inversely related to the distance between the rotatable disk and the respective magnet. By properly designing the spiral shape of the outer edge surface of the rotatable member or its width as shown in FIGS. 13 and 14, it is possible to establish a condition wherein the net coupling force between all four magnets and the disk member never equals zero. This means that there will always be some magnetic coupling force available from the magnets to rotate the disk member, and this force will always be in a direction to rotate the disk in the same direction which is the direction that tries to increase the coupling between each magnet and the disk. It has been possible to construct a disk member having a spiral shaped outer edge which fulfills this requirement. Hence, it is possible to always have a net coupling force to rotate the disk in a particular direction. By the same token, if the coupling produced by each electromagnet is suppressed as it moves past the high spot on the disk the coupling or driving force available to rotate the disk will be even greater. This in turn will increase the rotational power produced by the subject device.

FIGS. 13 and 14 show a modified form of the present device 120 wherein the rotating disk 122, rather than having a spiral shaped peripheral edge or edge surface has its opposite faces shaped so that the edge of the disk 122 goes from a minimum thickness at 124 to a maximum thickness at 126. In the construction 120, four magnets 128, 130, 132 and 134 (permanent or electromagnets) are positioned about the disk 122, and the coupling force between the magnets and the disk depends upon the mass of the portion of the disk adjacent to or in the field of each of the magnets 128-134. In the construction 120 the disk 120 is round and the magnets are all at a fixed constant distance from the edge fo the disk. The operation of the device 120 is similar to the operation of the devices shown in FIGS. 2 and 3 except that disk mass rather than distance from the disk edge to the magnets is the important variable.

In the construction shown in FIG. 14 the same principles apply as to the construction shown in FIG. 13. However, in the construction of FIG. 14 only one side of disk 140 is contoured to produce the desired variable mass condition of the edge portion.

FIG. 15 shows still another embodiment of the present device wherein the disk member 150 is constructed of a non-magnetic material and it has a spiral shaped edge 152. A conductor member 154 is mounted extending around the peripheral edge 152 of the disk 150, and the conductor member 154 is connected to a source of energy such as source 156 by means of commutators 158 and 160 and brushes 162 and 164. The brushes 162 and 164 are in turn connected through leads 166 and 168 to the power supply 156. The construction shown in FIG. 15 also has one or more spaced magnets 170-176 spaced about the outer edge of the disk 150. During operation of the device shown in FIG. 15 electric current passes through the conductor member 154 which is in the field of the magnets so that coupling is produced therebetween. Except for the fact that the construction shown in FIG. 15 uses a current carrying conductor member rather than a disk having a magnetizable peripheral portion it is similar to and operates similar to the other constructions described above.

Thus there has been shown and described several different embodiments of novel means for producing rotary motion which fulfill all of the objects and advantages sought therefor. It will be apparant to those skilled in the art, however, that many changes, variations, modifications and other uses and applications for the subject device are possible, and all such changes, variations, modifications and other uses and applications which do not depart from the spirit and scope of the invention are deemed to be covered by the invention which is limited only by the claims which follow:

What is claimed is:

1. A source of rotary energy comprising a rotatable member having an axis of rotation and means mounting the member for rotation about the axis of rotation, said member having a peripheral portion formed of magnetic material, the peripheral portion having an edge surface of spiral shape extending circumferentially entirely therearound and having a location of minimum and maximum radius at a common circumferential location, a plurality of magnetic members mounted at circumferentially spaced locations around the edge surface of the rotatable member, the instantaneous sum of the magnetic coupling forces between all of the magnetic members and the rotatable member producing a net coupling force that tries to rotate the rotatable member in a direction to increase the total amount of magnetic coupling therebetween, the magnetic members being electromagnets, and means to deenergize selected ones of the electromagnets at predetermined positions of the rotatable member relative thereto, including means for deenergizing each electromagnet in a predetermined time period during rotation of the rotatable member when each of the respective electromagnets is in its closest proximity to the rotatable member.

2. The source of claim 1 wherein the means for deenergizing each electromagnet includes electronic circuit means and sensor means connected thereto and positioned to respond to a predetermined position of the rotatable member during rotation thereof.

3. Means for converting magnetic force to mechanical force comprising a shaft rotatable about an axis thereof, a disk member mounted on said shaft for rotation therewith, said disk member having a peripheral portion formed of a permanently magnetized material, said peripheral portion varying in thickness entirely around the peripheral portion of the disk member, a magnetic member positioned adjacent to the peripheral portion in position to be magnetically coupled thereto and means to reduce the magnetic coupling force at a time when it acts to retard motion of the disk.

4. Means for converting magnetic force to mechanical force comprising a shaft rotatable about an axis thereof, a disk member mounted on said shaft for rotation therewith, said disk member having a peripheral portion formed of a permanently magnetized material, said peripheral portion varying in thickness entirely around the peripheral portion of the disk member, and a magnetic member positioned adjacent to the peripheral portion in position to be magnetically coupled thereto, said magnetic member being an electro-magnet having a coil thereon, and means for controlling the energizing of the coil to reduce the magnetic coupling force thereof with the peripheral portion of the disk member when the magnetic member is adjacent to the thickest portion of the disc member.

5. Means for producing rotary motion comprising a disk-like member mounted for rotation about an axis of rotation, said disk-like member having a peripheral permanent magnet portion, the peripheral portion of the disk-like member having a spiral shaped peripheral edge extending entirely therearound, a current carrying conductor mounted extending around the spiral shaped peripheral edge of the disk-like member, means for generating electric current in the conductor member, at least one magnet member mounted adjacent to the peripheral portion of the disk-like member in position to produce a magnetic coupling force therewith, the peripheral portion of the disk-like member having a characteristic shape that causes the magnetic coupling between the magnetic member and the disk-like member to vary continuously when the disk-like member rotates, and means to reduce the magnetic coupling force at a time when it acts to retard motion of the disk-like member.

6. Means for producing rotary motion comprising a disk-like member mounted for rotation about an axis of rotation, said disk-like member having a peripheral permanent magnet portion, four equally circumferentially spaced magnetic members located about the peripheral portion of the disk-like member in position to produce a magnetic coupling force therewith, the peripheral portion of the disk-like member having a characteristic shape entirely therearound that causes the magnetic coupling between the magnetic members and the disk-like member to vary continuously when the disk-like member rotates.

7. Means for producing rotary motion comprising a disk-like member mounted for rotation about an axis of rotation, said disk-like member having a peripheral portion formed of permanently magnetized material and a spiral shaped outer peripheral surface extending entirely therearound with adjacent locations of maximum and minimum radius, a plurality of magnetic members mounted at circumferentially spaced positions about the peripheral portion of the disk-like member in position to have a magnetic influence on the permanently magnetized peripheral portion of the disk-like member, the magnetic influence between the magnetic members and the peripheral portion of the disk-like member increasing as the said influence causes the disk-like member to rotate on its axis.

8. Means for producing rotary motion comprising a disk-like member mounted for rotation about an axis of rotation, said disk-like member having a peripheral portion formed of permanently magnetized material and a spiral shaped outer peripheral surface entirely therearound with adjacent locations of maximum and minimum radius, at least one permanent magnetic member mounted adjacent to the outer peripheral surface of the disk-like member in position to have a magnetic influence on the permanently magnetized peripheral portion of the disk-like member, the magnetic influence between the magnetic member and the peripheral portion of the disk-like member increasing as the said influence causes the disk-like member to rotate on its axis.

9. Means for producing rotary motion comprising a disk-like member mounted for rotation about an axis of rotation, said disk-like member having a peripheral portion formed of permanently magnetized material and a spiral shaped outer peripheral surface with adjacent locations of maximum and minimum radius, at least one magnetic member mounted adjacent to the outer peripheral surface of the disk-like member in position to have a magnetic influence on the permanently magnetized peripheral portion of the disk-like member, the magnetic influence between the magnetic member and the peripheral portion of the disk-like member increasing as the said influence causes the disk-like member to rotate on its axis, the magnetic member including a U-shaped member having spaced leg portions and a winding mounted thereon, the spaced leg portions of the U-shaped member being positioned adjacent circumferentially spaced locations on the outer peripheral portion of the disk-like member, and means to reduce the magnetic coupling force at a time when it acts to retard motion of the disk-like member.

10. The means of claim 9 wherein one of the leg portions of the U-shaped member is shorter than the other.

11. Means for producing rotary motion comprising a disk-like member mounted for rotation about an axis of rotation, said disk-like member have a peripheral portion formed of permanently magnetized material and a spiral shaped outer peripheral surface entirely therearound with adjacent locations of maximum and minimum radius, the peripheral edge surface of the disk-like member having circumferentially extending step portions, at least one magnetic member mounted adjacent to the outer peripheral surface of the disk-like member in position to have a magnetic influence on the permanently magnetic peripheral portion of the disk-like member, the magnetic influence between the magnetic member and the peripheral portion of the disk-like member increasing as the said influence causes the disk-like member to rotate on its axis, and means to reduce the magnetic coupling force at a time when it acts to retard motion of the disk-like member.

12. A source of rotary energy comprising a rotatable member having an axis of rotation and means mounting the member for rotation about the axis of rotation, said member having a peripheral portion formed of permanent magnetic material, the peripheral portion having an edge surface of spiral shape extending circumferentially entirely therearound and having a location of minimum and maximum radius at a common circumferential location, a plurality of magnetic members mounted at circumferentially spaced locations around the edge surface of the rotatable member, the instantaneous sum of the magnetic coupling force between all of the magnetic members and the rotatable member producing a net coupling force that tries to rotate the rotatable member in a direction to increase the total amount of magnetic coupling therebetween, the magnetic members being electromagnets, and means to deenergized selected ones of the electromagnets at predetermined positions of the rotatable member relative thereto to reduce the magnetic coupling force at a time when it acts to retard motion of the rotatable member.

13. Means for converting magnetic force to mechanical force comprising a shaft rotatable about an axis thereof, a disk member mounted on said shaft for rotation therewith, said disk member having a peripheral edge portion formed of permanently magnetized material, said peripheral edge portion having a spiral shaped peripheral edge surface entirely therearound, and a plurality of magnetic members mounted at spaced locations around the peripheral edge portion of the disk-like member in position to be magnetically coupled thereto.

14. Means for converting magnetic force to mechanical force comprising a shaft rotatable about an axis thereof, a disk member mounted on said shaft for rotation therewith, said disk member having a peripheral edge portion formed of magnetizable material, said peripheral edge portion having a spiral shaped peripheral edge surface entirely therearound, and an electromagnet member positioned adjacent to the edge portion in position to be magnetically coupled thereto.

15. The means of the claim 13 wherein the plurality of magnetic members are electromagnets.

* * * * *